(12) United States Patent
Kaufman et al.

(10) Patent No.: US 8,166,038 B2
(45) Date of Patent: Apr. 24, 2012

(54) INTELLIGENT RETRIEVAL OF DIGITAL ASSETS

(76) Inventors: Mark A. Kaufman, Newton, MA (US); Terry Smith, Rumford, RI (US)

( * ) Notice: Subject to any disclaimer, the term of this patent is extended or adjusted under 35 U.S.C. 154(b) by 330 days.

(21) Appl. No.: 12/482,811

(22) Filed: Jun. 11, 2009

(65) Prior Publication Data

US 2010/0318534 A1 Dec. 16, 2010

(51) Int. Cl.
 G06F 17/30 (2006.01)
(52) U.S. Cl. ........ 707/738; 707/640; 707/661; 707/736; 707/758; 709/203; 709/208; 709/229; 713/189; 380/45
(58) Field of Classification Search .................. None
See application file for complete search history.

(56) References Cited

U.S. PATENT DOCUMENTS

| | | | |
|---|---|---|---|
| 6,088,717 A * | 7/2000 | Reed et al. | 709/201 |
| 6,621,505 B1 * | 9/2003 | Beauchamp et al. | 715/764 |
| 6,990,636 B2 * | 1/2006 | Beauchamp et al. | 715/764 |
| 7,213,005 B2 * | 5/2007 | Mourad et al. | 705/64 |
| 7,225,208 B2 | 5/2007 | Midgley et al. | |
| 7,249,264 B2 * | 7/2007 | Belknap et al. | 713/189 |
| 7,280,658 B2 * | 10/2007 | Amini et al. | 380/45 |
| 7,383,462 B2 | 6/2008 | Osaki et al. | |
| 7,415,115 B2 | 8/2008 | Ma | |
| 7,483,926 B2 | 1/2009 | Chandhok et al. | |
| 7,509,356 B2 | 3/2009 | Cane et al. | |
| 7,596,570 B1 | 9/2009 | Emigh et al. | |
| 7,596,703 B2 | 9/2009 | Kohiyama et al. | |
| 7,600,133 B2 | 10/2009 | Long et al. | |
| 7,644,113 B2 | 1/2010 | Midgley et al. | |
| 7,657,550 B2 | 2/2010 | Prahlad et al. | |
| 7,657,586 B2 * | 2/2010 | Rodriguez et al. | 707/661 |
| 7,673,134 B2 | 3/2010 | Catherman et al. | |
| 7,689,510 B2 * | 3/2010 | Lamkin et al. | 705/51 |
| 2002/0103811 A1 * | 8/2002 | Fankhauser et al. | 707/104.1 |
| 2002/0107973 A1 | 8/2002 | Lennon et al. | |
| 2002/0184488 A1 * | 12/2002 | Amini et al. | 713/153 |
| 2005/0207569 A1 * | 9/2005 | Zhang et al. | 380/28 |
| 2009/0024596 A1 * | 1/2009 | Basso et al. | 707/4 |
| 2009/0150735 A1 * | 6/2009 | Israel et al. | 714/746 |

FOREIGN PATENT DOCUMENTS

| | | |
|---|---|---|
| WO | 02086799 A2 | 10/2002 |
| WO | 2008070688 A1 | 6/2008 |
| WO | 2009042113 A2 | 4/2009 |

* cited by examiner

*Primary Examiner* — Hung Le

(57) ABSTRACT

A technique enables intelligent retrieval of digital assets. The technique involves gathering metadata based on a scan of the digital assets. The gathered metadata includes metadata entries, each metadata entry identifying a particular digital asset and a particular set of digital asset properties of that particular digital asset. The technique further involves storing the digital assets in encrypted form within a digital asset repository of the electronic system after gathering the metadata, and updating a metadata database of the electronic system based on the metadata entries, the metadata database being distinct from the digital asset repository. Accordingly, while the digital assets are stored in the digital asset repository in encrypted form, specific digital assets within the digital asset repository are identifiable in response to a database search of the metadata database since the database search is able to use digital asset properties as searching criteria.

21 Claims, 5 Drawing Sheets

INTELLIGENT RETRIEVAL OF DIGITAL ASSETS

BACKGROUND

Conventional backup systems copy electronic files from primary storage (e.g., a high speed data storage array) to secondary storage (e.g., disks, tapes, etc.). For example, during a full backup routine, all files are copied from primary storage to secondary storage. Additionally, during an incremental backup routine, all files which have changed or which have been created since the last backup are copied from primary storage to secondary storage. Since secondary storage often resides at a remote location, the backup files of each backup routine are typically stored in encrypted form thus preventing unauthorized users from accessing the information on the backup files.

Similarly, conventional archive systems copy electronic files from primary storage to secondary storage. However, once the copies of the files reach secondary storage, the original files are removed from primary storage to recapture primary storage resources. For example, during an archive routine, all files residing on a particular volume, or older than a certain date, are transferred onto secondary storage thus freeing up primary storage disk space, backup resources, etc. for use on other files. Again, since secondary storage often resides at an offsite location, the archive files of each archive process are typically stored in encrypted form thus preventing unauthorized users from accessing the information on the archive files.

Retrieval of backup or archive files from the secondary storage system typically involves manual activity by a system technician or manager. Often, the technician must retrieve a subset of files from a larger set, but does not know up front just which files are relevant. For example, suppose that the secondary storage system receives and stores files from multiple different client computers as part of a particular backup or archive routine. Furthermore, for security purposes, suppose that the data on these files was encrypted by the client computers prior to being sent from the client computers to the secondary storage system.

To retrieve files relating to certain information (e.g., files relating to "Company ABC"), the technician enters one or more commands to the secondary storage system to retrieve all of the files from the particular backup or archive routine. The secondary storage system responds to these commands by decrypting all of the files which were backed up or archived during that particular backup or archive routine and storing decrypted copies of all of the files in a designated location. The technician is then able to manually navigate through the decrypted copies of all of the files (e.g., filter, sort, manually open and read, etc.) until the technician finds the files containing that information.

SUMMARY

Unfortunately, there are deficiencies in the above-described conventional backup and archive routines which, during file retrieval, require the technician to decrypt all of the files from a particular backup or archive routine, and then manually navigate through the decrypted files in order to find certain relevant files (e.g., files related to "Company ABC"). Nevertheless, this is the only option for the technician since the files on the secondary storage system are encrypted thus preventing the technician from knowing which files on the secondary storage system are relevant. Under this conventional retrieval approach, a lengthy amount of time and substantial computer resources (e.g., processing cycles, network bandwidth, etc.) may be required to decrypt and store all of the files from the particular backup or archive routine (e.g., the volumes may be large/massive) thus consuming resources which could have otherwise been devoted to other work. Additionally, once all of the files from the particular backup or archive routine have been decrypted, the technician is required to manually sift through all of the files for the relevant files which may be prone to error.

Furthermore, even if the technician restores files from an archive that does full indexing of the files, the technician does not have the ability to select a subset of the restored files based on particular file usage properties. For example, the technician cannot find files based on the frequencies with which the files were referenced (i.e., how often the files were accessed). Additionally, the technician cannot find files based on which users have accessed the files. Moreover, the technician cannot find files based on a historical file trail (e.g., the technician cannot determine whether file "A" was copied and became file "B", whether file "B" was then modified and emailed to another user who stored it as file "C", etc.). Unfortunately, conventional full indexing archive systems do not provide the technician with such capabilities.

In contrast to the above-described conventional backup/archive/retrieval approaches, improved techniques involve gathering metadata regarding files from multiple client systems before the client systems encrypt the data and send the encrypted files to a secondary storage system. With such metadata now available, the user is able to conveniently retrieve relevant files that originally reside on different client systems via a single operation. Utilizing the gathered metadata, such an operation is able to identify the relevant files from a larger set of files which resides in a secondary storage system even though the files originated from the multiple different client systems and even though the files are currently in encrypted form. For example, a user is capable of carrying out a single e-discovery operation on the gathered metadata to find and mark confidential all files relating to certain information (e.g., relating to "Company ABC") without needing to decrypt and manually sort through a larger set of files originating from multiple different client systems.

Along these lines, improved techniques enable intelligent retrieval of digital assets by storing digital assets (e.g., computerized files, voice-mail, instant message logs, e-mail, etc.) in encrypted form along with metadata which is gathered prior to digital asset storage. For example, encrypted digital assets can be safely stored within a backup or archive system, and the gathered metadata can be entered into a database. With the encrypted digital assets stored and the metadata available, a user is able to search the metadata based on certain digital asset properties (e.g., content-based properties, usage-based properties, etc.) and thus identify individual digital assets for retrieval even though none of the digital assets has yet been decrypted. Once the individual digital assets have been identified, only those digital assets are retrieved (e.g., decrypted and provided to the user). Such operation speeds up the retrieval process, uses fewer resources, and saves the user from having to manually sift through a large number of files that are of no interest. Additionally, such operation maintains maximum security since there is no need to decrypt digital assets when identifying the relevant digital assets.

One embodiment is directed to a method for providing access to digital assets which is performed in an electronic system. The method includes gathering metadata based on a scan of the digital assets (e.g., collecting metadata from a client device). The gathered metadata includes metadata entries, each metadata entry identifying a particular digital asset and a particular set of digital asset properties of that particular digital asset. The method further includes storing the digital assets in encrypted form within a digital asset repository of the electronic system after gathering the metadata. The digital asset repository operates as a protected source of the digital assets. The method further includes updating a metadata database of the electronic system based on the metadata entries, the metadata database being distinct from the digital asset repository. Accordingly, while the digital assets are stored in the digital asset repository in encrypted form, specific digital assets within the digital asset repository are identifiable in response to a database search of the metadata database since the database search is able to use digital asset properties as searching criteria. Such operation thus provides intelligent retrieval of digital assets.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique enables intelligent retrieval of digital assets by gathering metadata on client devices prior to encryption (e.g., while the digital assets are in use), and then retrieving the digital assets based on the gathered metadata while the digital assets are stored in encrypted form. For example, digital assets can be backed up or archived in encrypted form, and the gathered metadata can be entered into a database. With the encrypted digital assets stored and the metadata available, a user is able to search the metadata database based on certain digital asset properties (e.g., content-based properties, usage-based properties, etc.) and thus identify relevant digital assets for retrieval without decrypting digital assets (i.e., maximum security is maintained). Once the relevant digital assets have been identified, only those identified digital assets are retrieved (e.g., decrypted and provided to the user). Compared to conventional backup and archive systems which retrieve all files (e.g., perhaps a massive volume), the improved technique speeds up the retrieval process, uses fewer resources, and saves the user from having to manually sift through a large number of files that are of no interest.

Figure 1:
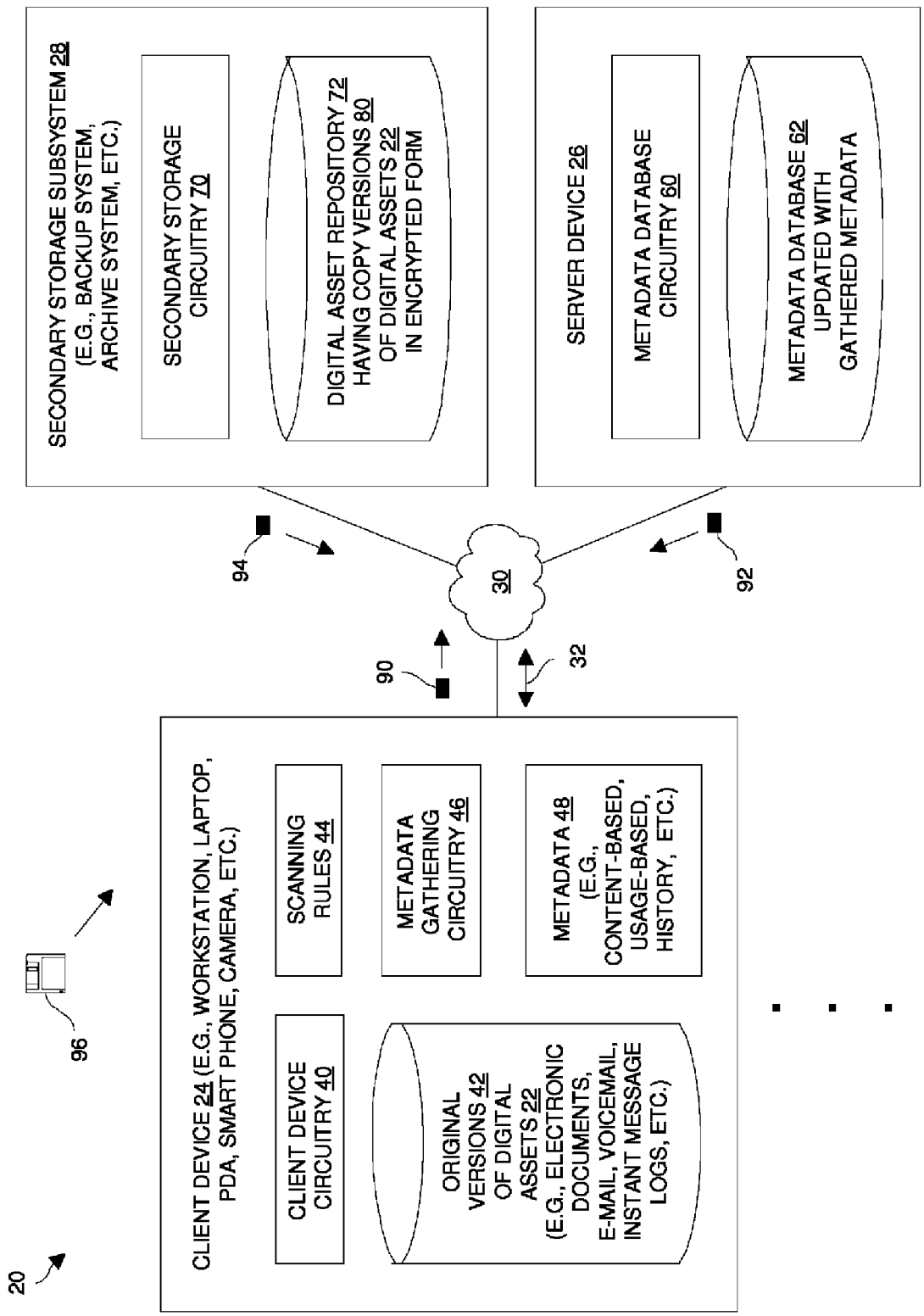
FIG. 1 is a block diagram of an electronic system which provides intelligent retrieval of digital assets.

FIG. 1 shows a block diagram of an electronic system 20 which provides intelligent retrieval of digital assets 22. The electronic system 20 includes a client device 24, a server device 26, a secondary storage subsystem 28, and communications media 30 (e.g., a network). The client device 24, the server device 26, and the secondary storage subsystem 28 communicate with each other through the communications media 30 via electronic signals 32 (illustrated by the two-way arrow 32 in FIG. 1). Although the electronic system 20 is shown in FIG. 1 as including only one client device 24 for simplicity, it should be understood that the electronic system 20 may include multiple client devices 24 which are provisioned similarly to that of the client device 24 shown in FIG. 1.

The client device 24 includes client device circuitry 40, original versions 42 of the digital assets 22, a set of scanning rules 44 (i.e., one or more scanning rules 44), metadata gathering circuitry 46 and metadata 48. The server device 26 includes metadata database circuitry 60 and a metadata database 62. The secondary storage subsystem 28 includes secondary storage circuitry 70 and a digital asset repository 72.

During operation, the client device 24 performs useful work on behalf of a user. In particular, the client device 24 operates as primary storage for a set of digital assets 22. For example, suppose that the client device 24 is a general purpose computer. In this situation, the client device circuitry 40 may run an application which creates and/or modifies an electronic file, i.e., an original version 42 of a digital asset 22. Along these lines, the user may run a word processing application which creates and/or modifies a text-based electronic document. As a result, an original version 42 of this digital asset 22 now resides on the client device 24.

Each time a digital asset 22 is accessed on the client device 24, the client device circuitry 40 updates the metadata 48 to reflect such access. Accordingly, the client device 40 is able to track usage properties of the digital assets 22 such as access frequency, ownership and chain of custody, when the last accesses were made, and so on.

At some later time (e.g., during a regularly scheduled backup or archive process), the client device 24 generates encrypted copies 80 of its digital assets 22 for storage on the secondary storage subsystem 28. For example, the secondary storage subsystem 28 may be a backup system which periodically performs a full backup of all of the digital assets 22 or an incremental backup only the digital assets which were created or modified since the last backup. In this situation, the secondary storage circuitry 70 of the secondary storage subsystem 28 stores the encrypted copies 80 of the digital assets 22 in the digital asset repository 72 while the original versions 42 continue to reside in the client device 24.

As another example, the secondary storage subsystem 28 may be an archive system which archives the digital assets 22 of the client device 24 after the expiration of a particular amount of time or after a certain date passes. In this situation, the secondary storage circuitry 70 of the secondary storage subsystem 28 stores the encrypted copies 80 of the digital assets 22 in the digital asset repository 72, and the client device 24 deletes the original versions 42 to free up resources on the client device 24.

In either the backup system or archive system context, the copied versions 80 of the digital assets 22 are safely stored for possible subsequent retrieval. Since the copied versions 80 were encrypted by the client device 24 (e.g., using standard encryption techniques), unauthorized users are prevented from accessing the information on the copied versions 80, i.e., an unauthorized user cannot successfully retrieve digital assets 22 from the secondary storage subsystem 28. Accordingly, the digital asset repository 72 operates as a protected source of the digital assets 22.

Further details of the intelligent retrieval aspects of the electronic system 20 will now be provided. Generally, the server device 26 coordinates and manages collection of the metadata 48 from each client device 24, by updating the metadata database 62 with digital asset property information described by the metadata 48. Such information preferably includes content-based properties and usage-based properties of each digital asset 22 stored in the digital asset repository 72 of the secondary storage subsystem 28. As a result, a user (e.g., an administrator, an end-user at a client device 24, etc.) can search the metadata database 62 to identify digital assets 22 having specific properties, and then retrieve only the identified digital assets 22 from the digital asset repository 72.

To this end, the client device 24 undergoes configuration by the server device 26 before the client device 24 generates the encrypted versions 80 for storage on the secondary storage subsystem 28. In particular, the metadata gathering circuitry 46 of the client device 24 sends a request message 90 to the server device 26 asking the server device 26 whether the server device 26 has any new scanning rules 44. Such a request message 90 can be sent periodically from the client device 24 to the server device 26. If the client device 24 does not yet have any scanning rules 44 or if the server device 26 has new scanning rules 44 which are different than those currently existing in the client device 24, the metadata database circuitry 60 of the server device 26 provides a response message 92 containing the new scanning rules 44 to the client device 24. Otherwise, the response message 92 indicates that there are no changes to be made to the scanning rules 44. In some arrangements, the client device 24 stores the scanning rules 44 in a set of XML (extensible markup language) files.

With the scanning rules 44 now in place on the client device 24, the metadata gathering circuitry 46 applies the scanning rules 44 to the original versions 42 of the digital assets 22 on the client device 24 to gather the metadata 48 regarding various properties of the digital assets 22. This metadata 48 is outputted by the metadata gathering circuitry 46 in the form of metadata entries. Each metadata entry identifies a particular digital asset 22 and a particular set of digital asset properties of that particular digital asset 22 (e.g., one metadata entry per each digital asset scan). It should be understood that the metadata entries can be temporarily buffered in the client device 24 (e.g., awaiting transmission to the server device 26 if the client and server devices 24, 26 are temporarily disconnected from each other).

In some arrangements, such application of the scanning rules 44 occurs on an original version 42 of a digital asset 22 just before the client device circuitry 40 generates an encrypted copy 80 of that digital asset 22 for storage on the subsystem 28. In another arrangement, such application occurs on an original version 42 of a digital asset 22 immediately after the original version 42 of the digital asset 22 has been created or modified. In yet other arrangements, scanning occurs routinely at a variety of different times such as those mentioned above as well as periodically and in response to detected events (e.g., copying a file, in response to a command from the server device 26, in response to startup of the client device 24, etc.).

When the client device 24 generates the encrypted copies 80 of the digital assets 22 and sends the encrypted copies 80 of the digital assets 22 to the secondary storage subsystem 28 for storage in the digital asset repository 72, the client device 24 also sends the gathered metadata 48 to the server device 26. The metadata database circuitry 60 receives the metadata 48 (i.e., metadata entries) and updates the metadata database 62 based on the metadata 48.

It should be understood that transferring the encrypted copies 80 of the digital assets 22 to the secondary storage subsystem 28 and sending of the metadata 48 to the server device 26 can be performed asynchronously. That is, the client device 24 can send the metadata 48 to the server device 26 at different times from when the client device 24 sends the encrypted copies 80 of the digital assets 22 to the secondary storage subsystem 28.

In some arrangements, the client device 24 does not maintain the metadata entries once they are sent to the server device 26. However, the client device 24 does maintain certain metadata information to make collection of metadata entries quicker.

When the server device 26 receives the metadata entries from the client device 24, the server device 26 is able to process the metadata entries to discern usage patterns (e.g., when the digital asset 22 was last accessed, how many times the digital assets 22 was accessed during the last month, etc.). Since the server device 26 determines digital asset usage patterns rather than the client device 24, the performance impact on the client device 24 is minimized.

Once (i) the versions 80 of the digital assets 22 are stored in the digital asset repository 72 of the secondary storage subsystem 28 and (ii) the metadata database 62 is updated with the gathered metadata 48, a user is now able to intelligently retrieve particular digital assets 22 (illustrated by reference numeral 94 in FIG. 1). In particular, the user is able to efficiently and effectively search for and find digital assets 22 within the digital asset repository 72 using digital asset properties as searching criteria. Such identification of specific digital assets is achievable even thought the versions 80 of the digital assets 22 are in encrypted form since the specific properties of the digital assets 22 were gathered at the client device 24 prior to encryption.

It should be understood that one or more of the above-described components of the electronic system 20 can be implemented using computerized processing circuitry and software. In particular, software applications can be delivered to the client device 24, the server device 26 and/or the secondary storage subsystem 28 in the form of computer program products 96 (illustrated generally by a diskette icon 96 in FIG. 1). Such computer program products 96 include computer readable media for storing instructions which, when executed by the processing circuitry 102, form the earlier-mentioned circuits. Examples of suitable computer readable media include tangible articles of manufacture and apparatus such as CD-ROM, flash memory, disk memory, tape memory, and the like. Further details will now be provided with reference to the following examples.

Content-Based Example

Suppose that the user wishes to retrieve only certain types of digital assets 22, i.e., digital assets 22 containing content of a certain format/type. In particular, suppose that the user wishes to know which digital assets 22 include social security numbers. To this end, the user is able to create a scanning rule 44 on the server device 26 having the following format:

IF DA_INCLUDES STRING [###-##-####], ADD KEYWORD [SS#]

and then send this scanning rule 44 to the client device 24. It should be understood that other syntax are suitable for use.

Once the client device 24 has this scanning rule 44, the client device 24 is able to apply this scanning rule 44 to the digital assets 22. In particular, when the metadata gathering circuitry 46 applies the scanning rule 44 to an original version 42 of a digital asset 22, the metadata gathering circuitry 46 creates a metadata entry which associates a keyword such as "SS#" with the digital asset 22 if a character string having the format "###-##-####" where "#" is a number between 0 and 9 exists within the original version 42 of the digital asset 22. Otherwise, the metadata gathering circuitry 46 does not create a metadata entry.

Recall that the metadata gathering circuitry 46 is capable of applying the scanning rule 44 to the original versions 42 of the digital assets 22 either at the time of creation or modification. Scans also run when there is a scanning rule change or at other times. For example, when an original set of scanning rules 44 is replaced with a new set of scanning rules 44, the client device 24 may apply the new set of scanning rules 44. Additionally, for digital assets 22 that change frequently (e.g., email or PST files), the client device 24 may apply the rules periodically rather than after each access.

When the metadata gathering circuitry 46 sends the gathered metadata 48 to the server device 26, the metadata database circuitry 60 updates the metadata database 62 based on each metadata entry of the gathered metadata. Accordingly, with the copied versions 80 of the digital assets 22 now residing in the secondary storage subsystem 28, if the user performs a database search on the metadata database 62 for digital assets 22 containing a social security number (i.e., if the user queries the database 62 for digital assets 22 associated with the keyword "SS#"), the user will successfully identify the copied versions 80 of the digital assets 22 in digital asset repository 72 even though the copied versions 80 are now in encrypted form. Thus, the user need only retrieve the identified digital assets 22 rather than all of the digital assets 22 that were backed up or archived by the secondary storage subsystem 28 at a particular time.

It should be understood that the metadata database 62 holds records which are searchable using a command line interface (e.g., SQL queries). To this end, the metadata database 62 holds digital asset records which identify properties of digital assets 22, i.e., each digital asset record corresponds to a particular digital asset 22 and includes property data (e.g., content information, usage information, etc.) regarding that digital asset 22. In some arrangements, the metadata database 62 further holds version records which identify properties of versions of digital assets 22, i.e., each version record corresponds to a version of a particular digital asset 22 and includes property data (e.g., content information, usage information, etc.) regarding that particular version of the particular digital asset 22.

Such intelligent file recovery alleviates the need to decrypt and store all of the files from the particular backup or archive routine (e.g., the volumes may be large/massive) as in conventional retrieval approaches. Furthermore, such intelligent retrieval alleviates the need for the user to manually sift through all of the restored files for the particular files as in conventional retrieval approaches. Moreover, such operation alleviates the need for conventional indexing at the repository 72 (e.g., un-encrypting digital assets and creating indexes, etc.).

Usage-Based Example

Suppose that the user wishes to retrieve only certain types of digital assets 22 which were accessed during a particular time period. For example, suppose that the user wishes to retrieve digital assets 22 having a file extension ".xyz" which were accessed during the last month. To this end, the user is able to create a scanning rule 44 on the server device 26 having the following format:

MONITOR [*.XYZ]

and then send this scanning rule 44 to the client device 24.

Once the client device 24 has received this scanning rule 44 from the server device 26, the client device 24 is able to apply this scanning rule 44 to the digital assets 22. In particular, the client device 24 is now configured to monitor activity regarding files with the ".xyz" extension. Along these lines, if the user accesses a digital asset 22 having "filename.xyz" as the filename format, the client device 24 captures metadata 48 regarding that access such as the access time (i.e., "last accessed") for that digital asset 22. Preferably, the client device 24 performs such monitoring and information gathering for a variety of activities such as a save operation, a move operation, etc. on the client device 24. The client device 24 then sends the collected metadata 48 perhaps along with other metadata 48 relating to other digital assets 22 to the server device 26.

The server device 26 then updates the metadata database 62 by processing the metadata 48 describing access activity for digital assets 22 of the filename format "filename.xyz" (e.g., the last access time) perhaps with other collected metadata 48. As a result, if the user subsequently performs a database search on the metadata database 62 for digital assets 22 of the filename format "filename.xyz" that were accessed during the last month, the user will successfully identify the copied versions 80 of those digital assets 22 in the digital asset repository 72 even though the copied versions 80 are in encrypted form.

It should be understood that other types of usage-based searches are available to the user as well. For instance, in a similar manner, the user is able to query the metadata database 62 for digital assets 22 of the filename format "filename.xyz" which were accessed more than a certain number of times (e.g., 3, 4, etc.) within a particular time window (e.g., a day, a week, a month, etc.). In this example, the server device 26 participates in usage pattern determination by accessing the metadata database 62 to identify the number of times a digital asset 22 has been accessed over the particular time window, i.e., the accumulated usage-based data regarding the digital asset 22 within the metadata database 62 represents a searchable usage history of the digital asset 22.

It should be further understood that the electronic system's ability to monitor digital assets 22 of specific filename formats (e.g., "filename.xyz") enables the electronic system 20 to ignore certain uninteresting types of activity. For example, if the client device 24 performs a software upgrade to files having a filename format which is not monitored and not of interest to the user, the activity pertaining to the upgrade is ignored by the client device 24 and thus not tracked within the metadata database 62 therefore saving processing resources of the electronic system 20.

Compound Examples

It should be understood that the metadata database 62 is capable of storing multiple properties regarding each digital asset 22. In particular, each digital asset 22 may have at least one content-based property and at least one usage-based property. As a result, the user is able to create complex database searches for precise identification of particular digital assets 22.

An example of a complex database search based on multiple content-based properties is a query that includes multiple types of content. For example, the user may wish to identify all of the digital assets having (i) social security number and (ii) medical records as part of a governmental compliance audit. To this end, the user creates scanning rules 44 which apply keywords to identify digital assets 22 having social security numbers, medical records or both. The client device 24 applies the scanning rules and gathers metadata 48, and the server device 26 updates the metadata database 62 based on the metadata 48. Accordingly, the user is then able to search the metadata database 62 and identify digital assets 22 having both security numbers and medical records.

An example of a complex database search based on multiple usage-based properties is a query for digital assets 22 that were (i) accessed at least three times in the last month and (ii) opened by a particular user. For example, the user may have lost a laptop and is in urgent need of obtaining all files which were accessed within the last month. Again, the user creates appropriate scanning rules which are then applied by the client device 24. Metadata is then gathered and inputted into the database 62 thus enabling the user to subsequently identify digital assets 22 fulfilling both criteria.

An example of a complex database search based on a content-based property and a usage-based property is a query for digital assets 22 mentioned a particular company name during a specific period of time. For example, the user may be tasked with freezing certain digital assets 22 mentioning the particular company during a critical window of time for litigation purposes.

It should be understood that nothing precludes a search from having more than two criteria. In particular, a search of the metadata database 62 can have any combination and any number of search parameters.

Further Details

It should be understood that once the specific versions 80 of the digital assets 22 are identified based on the data search of the metadata database 62 using digital asset properties as searching criteria, the server device 26 coordinates retrieval of the digital assets 22 via communications with the secondary storage subsystem 28. In particular, the server device 26 generates a list of digital assets 22 which meet the search criteria, and then retrieves the digital assets 22 based on the generated list.

For example, in response to an administrator command to place the specific digital assets 22 in a recovery area that is external to the client device 24, the server device 26 acquires the encrypted versions 80 of the listed digital assets 22 and decrypts and stores them on the server device 26. As another example, in response to an end-user command to place the specific assets in an area of the client device within which the original versions of digital assets originally resided, the server device 26 directs the secondary storage subsystem 28 to send the encrypted versions 80 of the listed digital assets 22 to the client device 24 and directs the client device 24 to decrypt and store decrypted versions of the digital assets 22 in the locations of the original versions 42 of the digital assets 22.

It should be understood that the user is able to restore the digital assets 22 from the digital asset repository 72 to whatever target storage location the user chooses. For example, the user is able to restore the digital assets 22 to an area on a client device 24, an area on the server device 26, or even an area which is separate from both the client and server devices 24, 26. Further details will now be provided with reference to FIG. 2.

Figure 2:
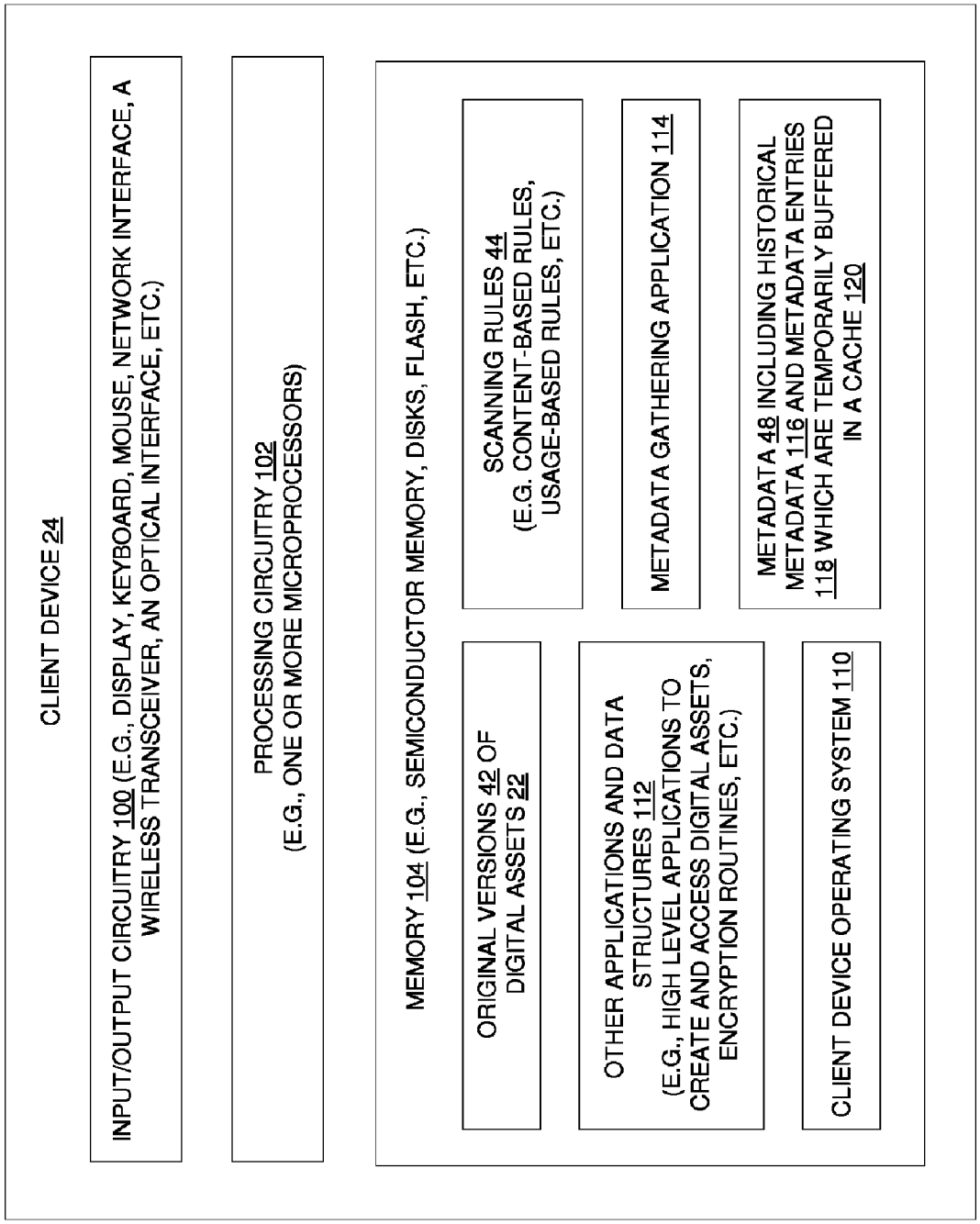
FIG. 2 is a detailed block diagram of a client device of the electronic system of FIG. 1.

FIG. 2 is a block diagram of a client device 24. Recall that the electronic system 20 can have more than one client device 24.

As shown in FIG. 2, the client device 24 includes input/output (I/O) circuitry 100, processing circuitry 102, and memory 104. The memory 104 stores a client device operating system 110, other applications and data structures 112, the original versions 42 of the digital assets 22, the scanning rules 44, a metadata gathering application 114, and the metadata 48. As mentioned above, the metadata 48 includes historical metadata 116 (i.e., metadata describing access frequency, when the last access occurred, who made the last access, chain of custody, etc.), and metadata entries 118.

Recall that the metadata entries 118 are results of applying the scanning rules 44 to the original versions 42 of the digital assets 22. Accordingly, the metadata entries 118 may include information describing content-based properties and usage-based properties of the digital assets 22.

It should be understood that the earlier-mentioned circuits of the client device 24 are effectively formed by the processing circuitry 102 running applications stored in the memory 104. For example, a microprocessor of the processing circuitry 102 running the operating system 110 and the metadata gathering application 114 is able to form the metadata gathering circuitry 46. Similarly, the microprocessor running the operating system 110 and another application 112 (e.g., a word processing application) is able to form the client device circuitry 40.

It should be further understood that a user is able to control the operation of the client device 24 using the I/O circuitry 100 (e.g., input commands and data through a mouse and keyboard, and output information on a display). Additionally, the client device 24 is able to connect to the communications medium 30 (also see FIG. 1) via the I/O circuitry 100 (e.g., a network interface, a wireless transceiver, an optical interface, etc.). In some arrangements, the client device 24 is a well-provisioned computer (e.g., a user workstation, a laptop, a server, etc.). In some arrangements, the client device 24 is a specialized handheld device (e.g., a smart phone, a PDA, etc.).

If the client device 24 becomes temporarily disconnected from the server device 26, the metadata gathering application 114 (also see the metadata gathering circuit 46 in FIG. 1) is constructed and arranged to buffer the metadata entries 118 at least temporarily in the memory 104. Accordingly, the metadata gathering application 114 is capable of subsequently transmitting the metadata entries 118 to the server device 26 once connection with the server device 26 is reestablished. Further details will now be provided with reference to FIG. 3.

Figure 3:
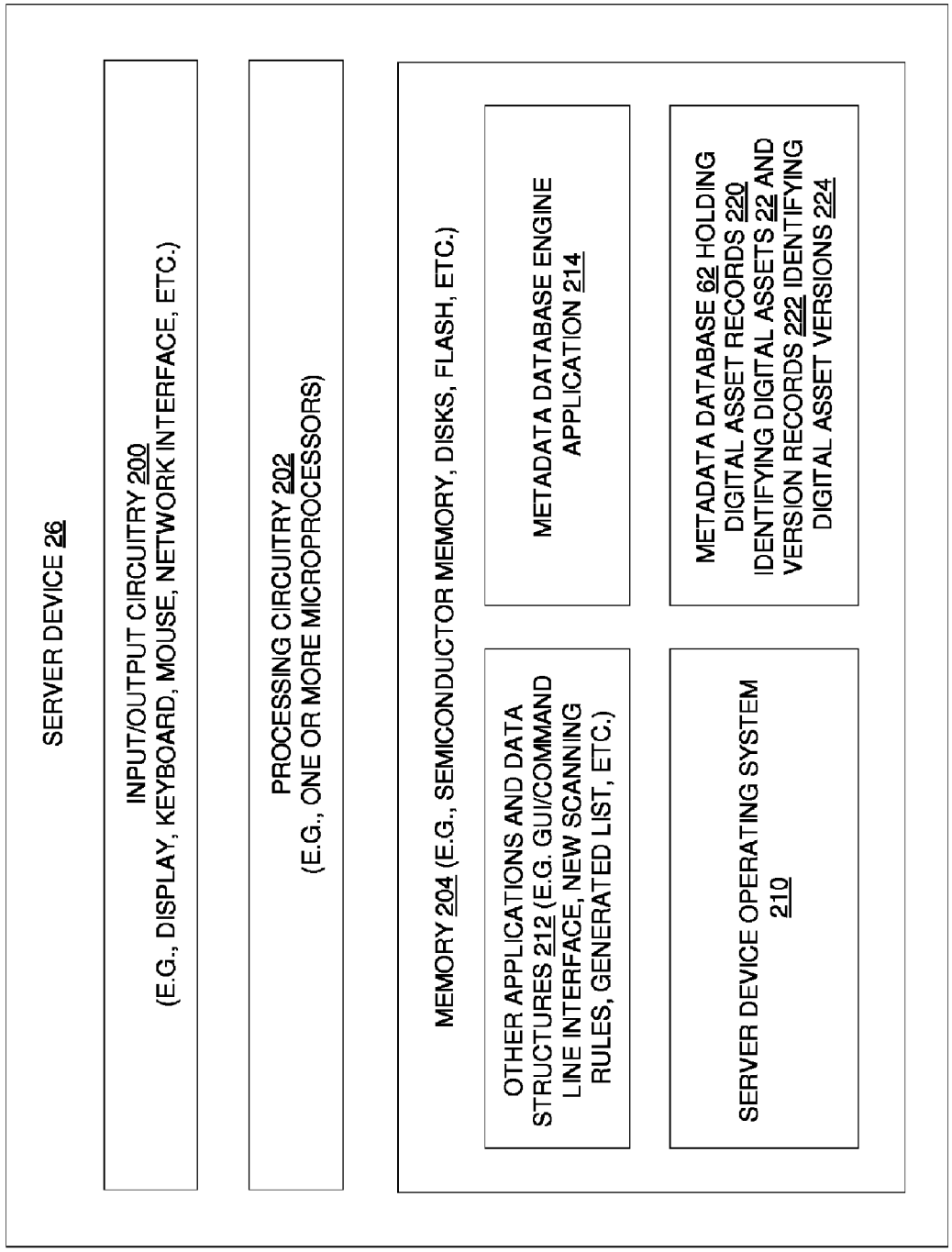
FIG. 3 is a detailed block diagram of a server device of the electronic system of FIG. 1.

FIG. 3 is a block diagram of the server device 26 which includes I/O circuitry 200, processing circuitry 202, and memory 204. The memory 204 stores a server device operating system 210, other applications and data structures 212, a metadata database application 214, and the metadata database 62 (also see FIG. 1).

The server device 26 is capable of operating as a control center for a user (e.g., an administrator of the electronic system 20). To this end, the processing circuitry 202 executes the server device operating system 210 and other applications 212 (e.g., a graphical user interface) enabling the user to carry out various operations. For example, through the I/O circuitry 200, the user is able to enter and convey new scanning rules 44 to each client device 24.

Additionally, the metadata database circuitry 60 (FIG. 1) is formed when the processing circuitry 202 runs the server device operating system 210 and the metadata database engine application 214. The metadata database engine application 214 running on the server device 26 communicates with the metadata gathering application 114 running on the client device 24 through the communications medium 30 (FIG. 1). Accordingly, the server device 26 is able to update its metadata database 62 by processing the metadata entries 118 from the client device 24.

Furthermore, the user is able to query the metadata database 62 to identify digital assets 22 in the digital asset repository 72 for retrieval based on particular content-based and/or usage-based properties. As mentioned earlier, the metadata database 62 holds a variety of records which are searchable using a standard database queries. In particular, the metadata database 62 holds digital asset records 220 which correspond to particular digital assets 22 and which identify properties of the particular digital assets 22 (e.g., content information, usage information, etc.). Additionally, the metadata database 62 holds version records 222 which uniquely correspond to particular versions 224 of digital assets 22 and which identify properties of the particular versions 224.

Suppose that version 1 of a digital asset 22 (e.g., a document) includes a reference to Company ABC, but that this reference was removed in a subsequent version of that digital asset 22. If the digital asset repository 72 still includes a copy of version 1, then the metadata database 62 includes a version record 222 which corresponds to version 1 in the digital asset repository 72. Accordingly, the system 20 allows the user to identify version 1 of the digital asset 22 via a search of the metadata database 62 for Company ABC.

Such operation as described above speeds up the digital asset retrieval process, uses fewer resources than conventional approaches, and saves the user from having to manually sift through a large number of files that are of no interest. Furthermore, security is maintained since there is no need to decrypt digital assets in order to determine whether the digital assets are relevant (e.g., whether a file relates to "Company ABC").

Figure 4:
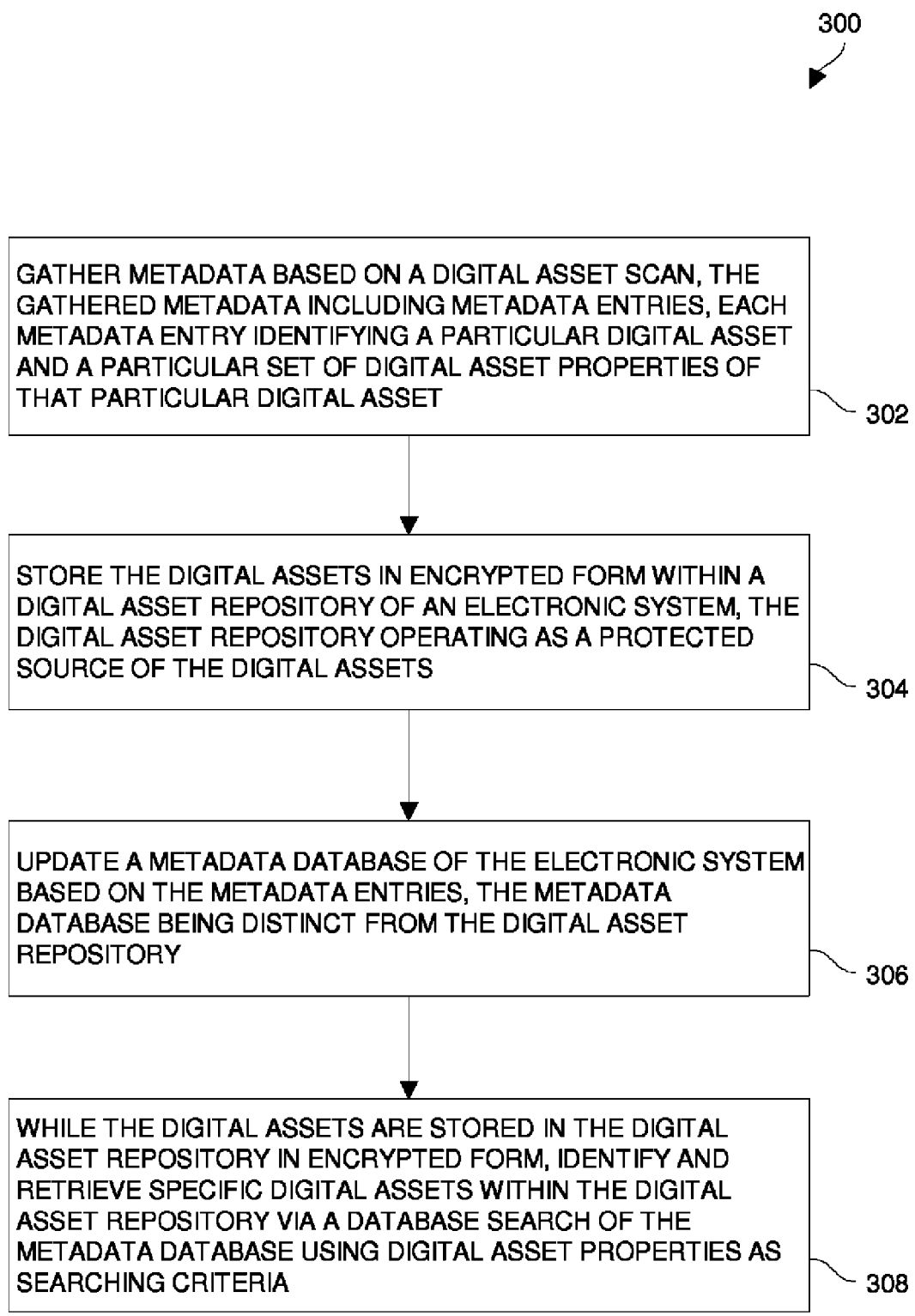
FIG. 4 is a flowchart of a procedure which is performed by the electronic system of FIG. 1.

FIG. 4 is a flowchart of a procedure 300 which is performed by the electronic system 20 when providing access to digital assets 22. In step 302, the client device 24 (FIG. 1) gathers metadata 48 based on a scan of the digital assets 22 (e.g., one of a series of scans performed in an ongoing manner by the client device 24). The gathered metadata 48 includes metadata entries 118 (FIG. 2). Each metadata entry 118 identifies a particular digital asset 22 and a particular set of digital asset properties of that particular digital asset 22.

In step 304, the secondary storage subsystem 28 stores the digital assets 22 in encrypted form within a digital asset repository 72 (FIG. 1). Accordingly, the digital asset repository operates as a protected source of the digital assets 22.

In step 306, the server device 26 updates the metadata database 62 based on the metadata entries 118. As shown in FIG. 1, the metadata database 62 of the server device 26 distinct from the digital asset repository 72 of the secondary storage subsystem 28 thus distinguishing the information in the metadata database 62 from standard operating system information such as filenames, access privileges, etc.

In step 308, the server device 26 is able to identify and retrieve specific digital assets 22 within the digital asset repository 72 in response to a database search of the metadata database 62. In particular, the server device 26 is able to identify digital assets 22 using digital asset properties as searching criteria (i.e., content-based properties, usage-based properties, etc) even though the versions of the digital assets 22 stored within the digital asset repository 72 are in encrypted form.

Figure 5:
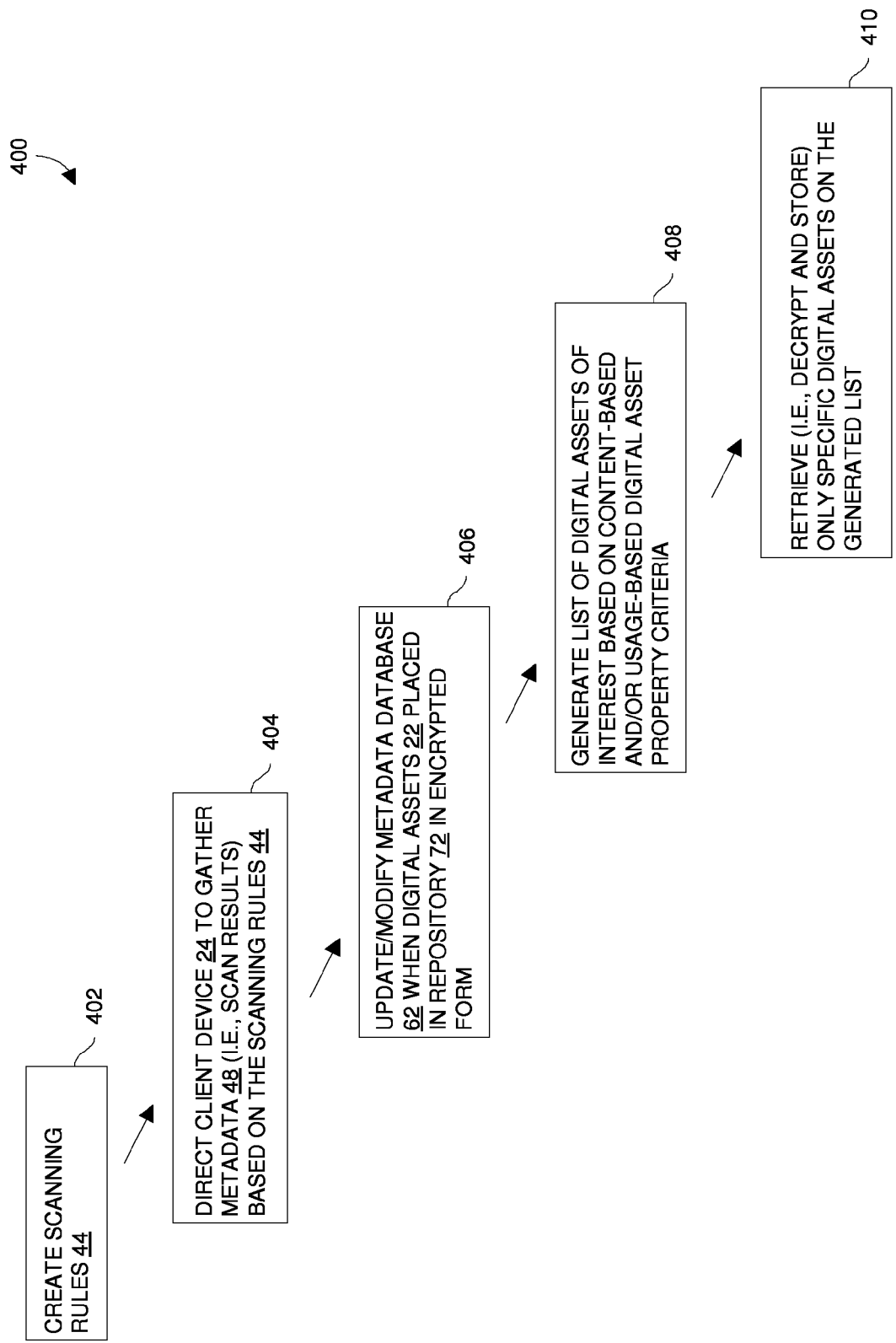
FIG. 5 is a flow diagram which illustrates a sequence of activities carried out during use of the electronic system of FIG. 1.

FIG. 5 is a flow diagram 400 which illustrates a sequence of activities 400 carried out during use of the electronic system 20. In step 402, the user creates a set of scanning rules 44 (also see FIG. 1). Examples of content-based scanning rules 44 are those which enable detection of digital assets 22 containing certain types of content, i.e., character strings of a particular format, tokens, symbols, and so on.

In step 404, the user provides the scanning rules 44 to the client device 24, and directs the client device 24 to gather metadata 48 (i.e., to generate scan results) based on the scanning rules 44. In some arrangements, the client device 24 receives an entire rule set both initially and during updates (e.g., even if only one rule has changed or is added). In other arrangements, the user is able to add, delete and modify the scanning rules 44 incrementally or individually at any time during operation of the electronic system 20. When a client device 24 receives a new scanning rule 44, the client device 24 applies the new scanning rule 44 in its future operations.

In step 406, the user effectuates updating/modifying of the metadata database 62 of the server device 26. For example, the user configures the server device 26 to receive and process the gathered metadata 48 (also see the metadata entries 118 in FIG. 2) periodically during routine backup or archiving processes performed by the secondary storage subsystem 28.

In step 408, the user initiates intelligent retrieval of digital assets 22 from the digital asset repository 72 (FIG. 1). In particular, the user performs a database query of the metadata database 62 using digital asset property searching criteria. The search results take the form of a list of digital assets 22 (also see the data structures 212 in FIG. 3).

In step 410, the user retrieves only the digital assets 22 on the generated list. That is, only those digital assets 22 precisely meeting the specific content type and usage pattern criteria provided by the user in step 408 are retrieved (i.e., decrypted and stored) from the repository 72. Accordingly, less resources and time are consumed compared to conventional retrieval approaches. Moreover, the user does not need to sift through a potentially massive amount of restored digital assets to find the digital assets of particular interest. The distinction between a conventional approach of decrypting all files and searching all the files for particular files versus an improved retrieval technique of searching first (step 408) and then decrypting only the identified digital assets 22 (step 410) is clearly illustrated in FIG. 5.

As described above, improved techniques enable intelligent retrieval of digital assets 22 by storing digital assets 22 in encrypted form along with metadata which is gathered prior to digital asset storage. For example, digital assets 22 can be backed up or archived in encrypted form, and the gathered metadata can be entered into a database 62. With the encrypted digital assets 22 stored and the metadata available, a user is able to search the database 62 based on certain digital asset properties (e.g., content type, usage patterns, etc.) and thus identify relevant digital assets 22 (or relevant versions of digital assets 22) for retrieval even though none of the digital assets 22 has yet been decrypted. Once the individual digital assets 22 have been identified, only those digital assets 22 are retrieved (e.g., decrypted and provided to the user). Compared to conventional backup and archive systems which retrieve all files (e.g., perhaps a massive volume), the improved techniques speed up the retrieval process, use fewer resources, and save the user from having to manually sift through large numbers of files that are of no interest.

It should be understood that, by querying the information in the metadata database 62, the user has the ability to select digital assets 22 in a manner that is unavailable on conventional archive systems which perform full indexing. For example, the user is able to identify digital assets 22 from the digital asset repository 72 based on frequencies with which the digital assets 22 were accessed (i.e., how often the digital assets 22 were accessed). Additionally, the user is able to identify digital assets 22 based on which users have accessed the digital assets 22. Furthermore, the user is able to identify all digital assets 22 derived from a particular digital asset 22 (e.g., the user is able to find digital assets "A", "B" and "C", when asset "A" was copied and became asset "B", and when asset "B" was then modified and emailed to another user who stored it as asset "C", etc.). All of these searches and similar searches are available to the user due to ongoing gathering of the metadata 48 from the client devices 24 (i.e., activity tracking) and availability of asset property information to the user on the server device 26 (database searching of the metadata database 62).

While various embodiments of the invention have been particularly shown and described, it will be understood by those skilled in the art that various changes in form and details may be made therein without departing from the spirit and scope of the invention as defined by the appended claims.

For example, FIG. 1 shows the server device 26 and the secondary storage subsystem 28 as being separate devices which communicate through a network 30. In some arrangements, the secondary storage subsystem 28 is an off-the-shelf subsystem such as a traditional backup system, a traditional archive system, etc. In these arrangements, the digital asset repository 72 is capable of being entirely separate and independent from metadata scanning and collecting (e.g., operation of the digital asset repository 72 does not need to be synchronized with metadata scanning and collecting, and no copies of the digital assets 22 need to be transferred to or stored on the server device 26). Rather, the secondary storage subsystem 28 is simply customized to take direction from both the client device 24 (e.g., when storing digital assets 22) and the server device 26 (e.g., when retrieving digital assets 22).

In other arrangements, the server device 26 and the secondary storage subsystem 28 are more tightly integrated. For example, they may share certain components such as processors, main memory, disk memory, etc. Preferably, the metadata database 62 of the server device 26 remains distinct from the digital asset repository 72 of the secondary storage subsystem 28.

An example of digital asset management environment for which at least some of the above-described improvements are suitable is described in International Application No. PCT/US2005/041773, filed on Nov. 17, 2005 and entitled "SYSTEMS AND METHODS FOR MANAGING DIGITAL ASSETS", the teachings of which are hereby incorporated by reference in their entirety. Another example of digital asset management environment for which at least some of the above-described improvements are suitable is described in International Application No. PCT/US2007/083195, filed on Oct. 31, 2007 and entitled "SYSTEMS AND METHODS FOR INFORMATION ORGANIZATION", the teachings of which are hereby incorporated by reference in their entirety.

Additionally, it should be understood that the server device 26 and the secondary storage subsystem 28 were described above as being separate and independent (i.e., connected as devices on a network) by way of example only. In other arrangements, the server device 26 and the secondary storage subsystem 28 are integrated and share resources (e.g., within the same enclosure, share processors, share memory, etc.). For instance, in some arrangements, the digital asset repository 72 and the metadata database 62 are implemented as one database in combination with separate tables in a tightly integrated manner.

Furthermore, the client devices 24 were described above as being primary storage devices (e.g., user workstations, laptops, smart devices, etc.) by way of example only. It should be understood that the client devices 24 may take a variety of other forms such as network attached storage, remote or secondary storage, and so on.

Additionally, the client devices 24 were described above as performing scans around the time of digital asset access. The client devices 24 may also carry out scanning just prior to digital asset encryption and transferring the encrypted versions 80 of the digital assets 22 to the secondary storage subsystem 28.

Furthermore, it should be understood that the digital asset retrieval process was described above as including decryption of the digital assets 22 by way of example only. In some situations (e.g., administrative restores, for litigation purposes, etc.), decryption may not be desired or may be preferably delayed. In such situations, retrieval of digital assets 22 from the repository 72 (FIG. 1) involves fetching copy versions 80 of the digital assets 22 from the repository 72 and maintaining these copy versions 80 in encrypted form at a designated location. In these situations, an authorized user may hold the key(s) or have access to the key(s) to control decryption of the digital assets 22 at a later time.

Additionally, it should be understood that the communications media 30 was illustrated as a network cloud (e.g., a computerized network) in FIG. 1 by way of example only. It should be understood that a variety of topologies are suitable for use for the electronic system 20, e.g., point-to-point, backbone or multi-drop bus, loop, irregular, and so on.

What is claimed is:

1. In an electronic system, a method of providing access to digital assets, the method comprising:
  gathering metadata based on a scan of the digital assets, the gathered metadata including metadata entries, each metadata entry identifying a particular digital asset and a particular set of digital asset properties of that particular digital asset;
  after gathering the metadata, storing the digital assets in encrypted form within a digital asset repository of the electronic system, the digital asset repository operating as a protected source of the digital assets; and
  updating a metadata database of the electronic system based on the metadata entries, the metadata database being distinct from the digital asset repository;
  wherein, while the digital assets are stored in the digital asset repository in encrypted form, specific digital assets within the digital asset repository are identifiable in response to a database search of the metadata database, the database search using digital asset properties as searching criteria;
  wherein the electronic system includes a client device and a server device;
  wherein gathering the metadata based on the scan of the digital assets includes (i) scanning original versions of the digital assets on the client device, the original version of the digital assets being in non-encrypted form, and (ii) generating, as the metadata entries, a set of scan results on the client device based on scanning the original versions of the digital assets;
  wherein updating the metadata database of the electronic system based on the metadata entries includes (i) communicating the set of scan results from the client device to the server device through a network, and (ii) modifying the metadata database based on the set of scan results from the client device, the metadata database residing on the server device;
  wherein scanning the original versions of the digital assets on the client device includes:
    obtaining a set of scanning rules from the server device, and
    applying the set of scanning rules to the original versions of the digital assets to identify, within the set of scan results, digital asset properties of the digital assets; and
  wherein the client device is constructed and arranged to periodically send a scanning rule update request to the server device; and wherein obtaining the set of scanning rules from the server device includes:

receiving a new set of scanning rules from the server device in response to a particular scanning rule update request, and replacing a previous set of scanning rules on the client device with the new set of scanning rules, the new set of scanning rules including at least one scanning rule with did not exist in the previous set of scanning rules.

2. A method as in claim 1 wherein the set of scanning rules includes a usage-based scanning rule; and wherein applying the set of scanning rules to the original versions of the digital assets includes:

monitoring access of a digital asset based on the usage-based scanning rule to obtain usage-based data regarding the digital asset, the usage-based data representing at least a portion of usage history of the digital asset.

3. A method as in claim 1 wherein the set of scanning rules includes a content-based scanning rule; and wherein applying the set of scanning rules to the original versions of the digital assets includes:

identifying whether a specific type of content resides within each digital asset based on a comparison of content of that digital asset and the content-based scanning rule.

4. A method as in claim 1 wherein applying the set of scanning rules to the original versions of the digital assets to identify digital asset properties of the digital assets includes:

running a metadata gathering application on the client device to generate the set of scan results, the metadata gathering application being constructed and arranged to communicate with a metadata database engine application running on the server device through the network.

5. A method as in claim 4, further comprising:

buffering the set of scan results in a temporary cache on the client device while the metadata gathering application is out of communication with the metadata database engine application in response to the client device becoming disconnected from the server device, and conveying the set of scan results from the temporary cache on the client device to the metadata database engine application in response to the client device reconnecting with the server device through the network.

6. A method as in claim 4 wherein storing the digital assets in encrypted form within the digital asset repository of the electronic system includes:

after applying the set of scanning rules to the original versions of the digital assets, encrypting the original versions of the digital assets on the client device to form copies of the digital assets in encrypted form, and transferring the copies of the digital assets in encrypted form from the client device to a digital asset repository application through the network, the digital asset repository application being constructed and arrange to store the copies of the digital assets in encrypted form within the digital asset repository.

7. A method as in claim 6 wherein transferring the copies of the digital assets in encrypted form includes:

conveying the copies of the digital assets in encrypted form from the client device to a storage subsystem which (i) holds the digital asset repository and (ii) runs the digital asset repository application, the storage subsystem being external to both the client device and the server device.

8. A method as in claim 4, further comprising:

on the metadata database, performing the database search using digital asset properties as searching criteria to generate a list of specific digital assets within the digital asset repository; and retrieving the specific digital assets from the digital asset repository based on the generated list.

9. A method as in claim 8 wherein the metadata database includes digital asset records, each digital asset record identifying a particular digital asset residing in the digital asset repository and describing specific digital asset properties of that particular digital asset; and wherein performing the database search using digital asset properties as searching criteria includes:

searching the metadata database for digital asset records indicating that a specific type of content resides in a particular digital asset, and putting an identifier of that particular digital asset on the list when the digital asset record indicating that the particular digital asset indicates that the specific type of content resides in the particular digital asset.

10. A method as in claim 8 wherein the database search is performed in response to an administrator command to place the specific digital assets in a recovery area that is external to the client device; and wherein retrieving the specific digital assets from the digital asset repository based on the generated list includes:

decrypting the specific digital assets from the digital asset repository to generate restored versions of the specific digital assets, and storing the restored versions of the specific digital assets in the recovery area that is external to the client device.

11. A method as in claim 8 wherein the database search is performed in response to an end-user command to place the specific digital assets in an area of the client device within which the original versions of digital assets originally resided; and wherein retrieving the specific digital assets from the digital asset repository based on the generated list includes:

decrypting the specific digital assets from the digital asset repository to generate restored versions of the specific digital assets, and storing the restored versions of the specific digital assets in the area of the client device within which the original versions of digital assets originally resided.

12. A method as in claim 8 wherein the metadata database includes version records, each version record identifying a particular version of a digital asset residing in the digital asset repository and describing specific digital asset properties of that particular version of that particular digital asset; and wherein performing the database search using digital asset properties as searching criteria includes:

querying the metadata database for relevant version records to identify relevant versions of digital assets within the digital asset repository.

13. A method as in claim 8 wherein the metadata database includes digital asset records, each digital asset record identifying a particular digital asset residing in the digital asset repository and describing specific digital asset properties of that particular digital asset; and wherein performing the database search using digital asset properties as searching criteria includes:

searching the metadata database for digital asset records describing a specific digital asset usage pattern, and putting an identifier of a particular digital asset on the list when the digital asset record identifying the particular digital asset describes the specific digital asset usage pattern.

14. A method as in claim 1 wherein the digital asset repository includes a backup subsystem; and wherein storing the digital assets in encrypted form within the digital asset repository includes performing a backup operation to back up the digital assets on the backup subsystem in encrypted form while the original versions of the digital assets continue to reside on the client device in non-encrypted form, the original versions of the digital assets being maintained on the client device in non-encrypted form after completion of the backup operation.

15. A method as in claim 14, further comprising:
after completion of the backup operation and in response to a loss of an original version of a particular digital asset on the client device, performing a retrieval operation to retrieve the particular digital asset from the backup subsystem and placing a restored version of the particular digital asset on the client device, the restored version of the particular digital asset being maintained on the client device in non-encrypted form after completion of the retrieval operation and while the particular digital asset remains backed up on the backup subsystem in encrypted form.

16. An electronic system to provide access to digital assets, the electronic system comprising:
metadata gathering circuitry constructed and arranged to gather metadata based on a scan of the digital assets, the gathered metadata including metadata entries, each metadata entry identifying a particular digital asset and a particular set of digital asset properties of that particular digital asset;
digital asset storage circuitry constructed and arranged to, after the metadata is gathered, store the digital assets in encrypted form within a digital asset repository, the digital asset repository operating as a protected source of the digital assets; and
metadata database circuitry coupled to the metadata gathering circuitry and the digital asset storage circuitry, the metadata database circuitry being constructed and arranged to update a metadata database based on the metadata entries, the metadata database being distinct from the digital asset repository;
wherein, while the digital assets are stored in the digital asset repository in encrypted form, specific digital assets within the digital asset repository are identifiable in response to a database search of the metadata database, the database search using digital asset properties as searching criteria;
wherein the electronic system includes a client device which has the metadata gathering circuitry, and a server device which has the metadata database circuitry;
wherein the metadata gathering circuitry, when gathering the metadata based on the scan of the digital assets, is constructed and arranged to (i) scan original versions of the digital assets on the client device, the original version of the digital assets being in non-encrypted form, and (ii) generate, as the metadata entries, a set of scan results on the client device based on scanning the original versions of the digital assets;
wherein the metadata database circuitry, when updating the metadata database of the electronic system based on the metadata entries, is constructed and arranged to (i) communicate the set of scan results from the client device to the server device through a network, and (ii) modify the metadata database based on the set of scan results from the client device, the metadata database residing on the server device;
wherein the metadata gathering circuitry, when scanning the original versions of the digital assets on the client device, is constructed and arranged to:
obtain a set of scanning rules from the server device, and
apply the set of scanning rules to the original versions of the digital assets to identify, within the set of scan results, digital asset properties of the digital assets;
wherein the client device is constructed and arranged to periodically send a scanning rule update request to the server device; and
wherein the metadata gathering circuitry, when obtaining the set of scanning rules from the server device, is constructed and arranged to:
receive a new set of scanning rules from the server device in response to a particular scanning rule update request, and
replace a previous set of scanning rules on the client device with the new set of scanning rules, the new set of scanning rules including at least one scanning rule with did not exist in the previous set of scanning rules.

17. An electronic system as in claim 16 wherein the metadata gathering circuitry includes processing circuitry and memory coupled to the processing circuitry, the memory storing a metadata gathering application; and
wherein the metadata gathering circuitry, when applying the set of scanning rules to the original versions of the digital assets to identify digital asset properties of the digital assets, is constructed and arranged to:
using the processing circuitry, run the metadata gathering application stored in the memory to generate the set of scan results, the metadata gathering application being constructed and arranged to communicate with a metadata database engine application running on the server device through the network.

18. An electronic system as in claim 17, further comprising:
a temporary cache to buffer the set of scan results while the metadata gathering application is out of communication with the metadata database engine application in response to the client device becoming disconnected from the server device, and
input/output circuitry to convey the set of scan results from the temporary cache to the metadata database engine application in response to the client device reconnecting with the server device through the network.

19. A computer program product including a computer readable medium having instructions stored thereon which, when executed by computerized equipment, direct the computerized equipment to:
gather metadata based on a scan of the digital assets, the gathered metadata including metadata entries, each metadata entry identifying a particular digital asset and a particular set of digital asset properties of that particular digital asset;
after gathering the metadata, store the digital assets in encrypted form within a digital asset repository of an electronic system, the digital asset repository operating as a protected source of the digital assets; and
update a metadata database of the electronic system based on the metadata entries, the metadata database being distinct from the digital asset repository;
wherein, while the digital assets are stored in the digital asset repository in encrypted form, specific digital assets within the digital asset repository are identifiable in response to a database search of the metadata database, the database search using digital asset properties as searching criteria;
wherein the electronic system includes a client device and a server device;
wherein gathering the metadata based on the scan of the digital assets includes (i) scanning original versions of the digital assets on the client device, the original version of the digital assets being in non-encrypted form, and (ii) generating, as the metadata entries, a set of scan results on the client device based on scanning the original versions of the digital assets;

wherein updating the metadata database of the electronic system based on the metadata entries includes (i) communicating the set of scan results from the client device to the server device through a network, and (ii) modifying the metadata database based on the set of scan results from the client device, the metadata database residing on the server device;

wherein scanning the original versions of the digital assets on the client device includes:
    obtaining a set of scanning rules from the server device, and
    applying the set of scanning rules to the original versions of the digital assets to identify, within the set of scan results, digital asset properties of the digital assets; and wherein the client device is constructed and arranged to periodically send a scanning rule update request to the server device; and wherein obtaining the set of scanning rules from the server device includes:
    receiving a new set of scanning rules from the server device in response to a particular scanning rule update request, and
    replacing a previous set of scanning rules on the client device with the new set of scanning rules, the new set of scanning rules including at least one scanning rule with did not exist in the previous set of scanning rules.

20. A computer program product as in claim 19 wherein applying the set of scanning rules to the original versions of the digital assets to identify digital asset properties of the digital assets includes:
    running a metadata gathering application on the client device to generate the set of scan results, the metadata gathering application being constructed and arranged to communicate with a metadata database engine application running on the server device through the network.

21. A computer program product as in claim 20 wherein the instructions, when executed by the computerized equipment, further direct the computerized equipment to:
    buffer the set of scan results in a temporary cache on the client device while the metadata gathering application is out of communication with the metadata database engine application in response to the client device becoming disconnected from the server device, and
    convey the set of scan results from the temporary cache on the client device to the metadata database engine application in response to the client device reconnecting with the server device through the network.

\* \* \* \* \*